United States Patent
Lin et al.

(10) Patent No.: US 7,110,478 B2
(45) Date of Patent: Sep. 19, 2006

(54) PHASE DIFFERENCE BASED FREQUENCY CORRECTION CHANNEL DETECTOR FOR WIRELESS COMMUNICATION SYSTEM

(75) Inventors: Jingdong Lin, Irvine, CA (US); Justine Zhuang, Shanghai (CN); Tong Zhao, Stanford, CA (US)

(73) Assignee: Spreadtrum Communications Corporation, Sunnyvale, CA (US)

( * ) Notice: Subject to any disclaimer, the term of this patent is extended or adjusted under 35 U.S.C. 154(b) by 861 days.

(21) Appl. No.: 10/119,409

(22) Filed: Apr. 9, 2002

(65) Prior Publication Data

US 2003/0189978 A1 Oct. 9, 2003

(51) Int. Cl.
*H03D 1/00* (2006.01)
*H04L 27/06* (2006.01)

(52) U.S. Cl. ..................................... 375/340

(58) Field of Classification Search .............. 375/224, 375/316, 340; 455/423
See application file for complete search history.

(56) References Cited

U.S. PATENT DOCUMENTS

| | | | | |
|---|---|---|---|---|
| 5,442,694 A | * | 8/1995 | Chitrapu et al. | 379/373.01 |
| 5,724,657 A | * | 3/1998 | Lin et al. | 455/423 |
| 5,761,250 A | | 6/1998 | Lin | |
| 5,970,102 A | * | 10/1999 | Hwang | 375/340 |
| 6,333,953 B1 | | 12/2001 | Bottomley et al. | |
| 6,356,608 B1 | * | 3/2002 | Atarius | 375/362 |
| 6,396,883 B1 | * | 5/2002 | Yang et al. | 375/340 |
| 6,549,587 B1 | * | 4/2003 | Li | 375/326 |
| 6,873,836 B1 | * | 3/2005 | Sorrells et al. | 455/313 |
| 6,912,209 B1 | * | 6/2005 | Thi et al. | 370/286 |
| 2001/0033583 A1 | * | 10/2001 | Rabenko et al. | 370/503 |

\* cited by examiner

*Primary Examiner*—Betsy L. Deppe
(74) *Attorney, Agent, or Firm*—Perkins Coie LLP

(57) ABSTRACT

A method of detecting a tone signal from complex input samples r(n) in a wireless communication system is disclosed. The method comprises calculating the phase difference of the samples r(n) as a signal x(n). Next, the signal x(n) is filtered with a notch filter to generate a notched output y(n). The power of both the signal x(n) and the notched output y(n) is estimated. The ratio of the powers of the notched output y(n) and signal x(n) is calculated. The tone signal is detected if the ratio is below a predetermined threshold for a predetermined duration of time.

20 Claims, 2 Drawing Sheets

PHASE DIFFERENCE BASED FREQUENCY CORRECTION CHANNEL DETECTOR FOR WIRELESS COMMUNICATION SYSTEM

TECHNICAL FIELD

The present invention relates to a circuit and method for detection of a frequency correction channel, and more particularly, to a system and method for detecting a frequency correction channel based upon the phase difference of a received signal.

BACKGROUND

The Global System for Mobile Communications (GSM) is a cellular telecommunications system that is used throughout the world. In one specific implementation, GSM utilizes two bands of 25 MHz, which have been set aside for system use. The 890–915 MHz band is used for subscriber to base station transmissions (reverse link), and the 935–960 MHz band is used for base station to subscriber transmissions (forward link). However, it can be appreciated that other bandwidths and frequency ranges may also be used to implement the GSM protocol. The GSM protocol uses frequency division duplexing and time division multiple access (TDMA) techniques to provide base stations with simultaneous access to multiple users. Transmissions on both the forward and reverse link are made at a channel data rate of approximately 270 Kbps, using binary Gaussian minimum shift key (GMSK) modulation.

In the GSM protocol, there are traffic channels and control channels. The traffic channels carry the digitized voice or user data. The control channels include what is known as the frequency correction channel (FCCH), which is a special data burst which occupies time slot 0 for the very first GSM frame and is repeated every ten frames within a control channel multiframe. The FCCH allows each subscriber unit to synchronize its internal frequency standard (local oscillator) to the exact frequency of the base station.

Typically, the frequency correction channel is a single tone with a nominal frequency within a given frequency range, and repeats every 50 bursts. However, factors such as strong Gaussian noise, strong co-channel or adjacent channel interference, and severe fading, have made a typical multi-band filtering method quite unreliable and time consuming. The net effect from the user's perspective thus becomes long establishing periods.

BRIEF DESCRIPTION OF THE DRAWINGS

In the drawings, the same reference numbers identify identical or substantially similar elements or acts. To easily identify the discussion of any particular element or act, the most significant digit or digits in a reference number refer to the Figure number in which that element is first introduced (e.g., element 201 is first introduced and discussed with respect to FIG. 2).

As is conventional in the field of electrical circuit representation, sizes of electrical components are not drawn to scale, and various components can be enlarged or reduced to improve drawing legibility. Component details have been abstracted in the Figures to exclude details such as position of components and certain precise connections between such components when such details are unnecessary to the invention.

The headings provided herein are for convenience only and do not necessarily affect the scope or meaning of the claimed invention.

Figures 1, 2:
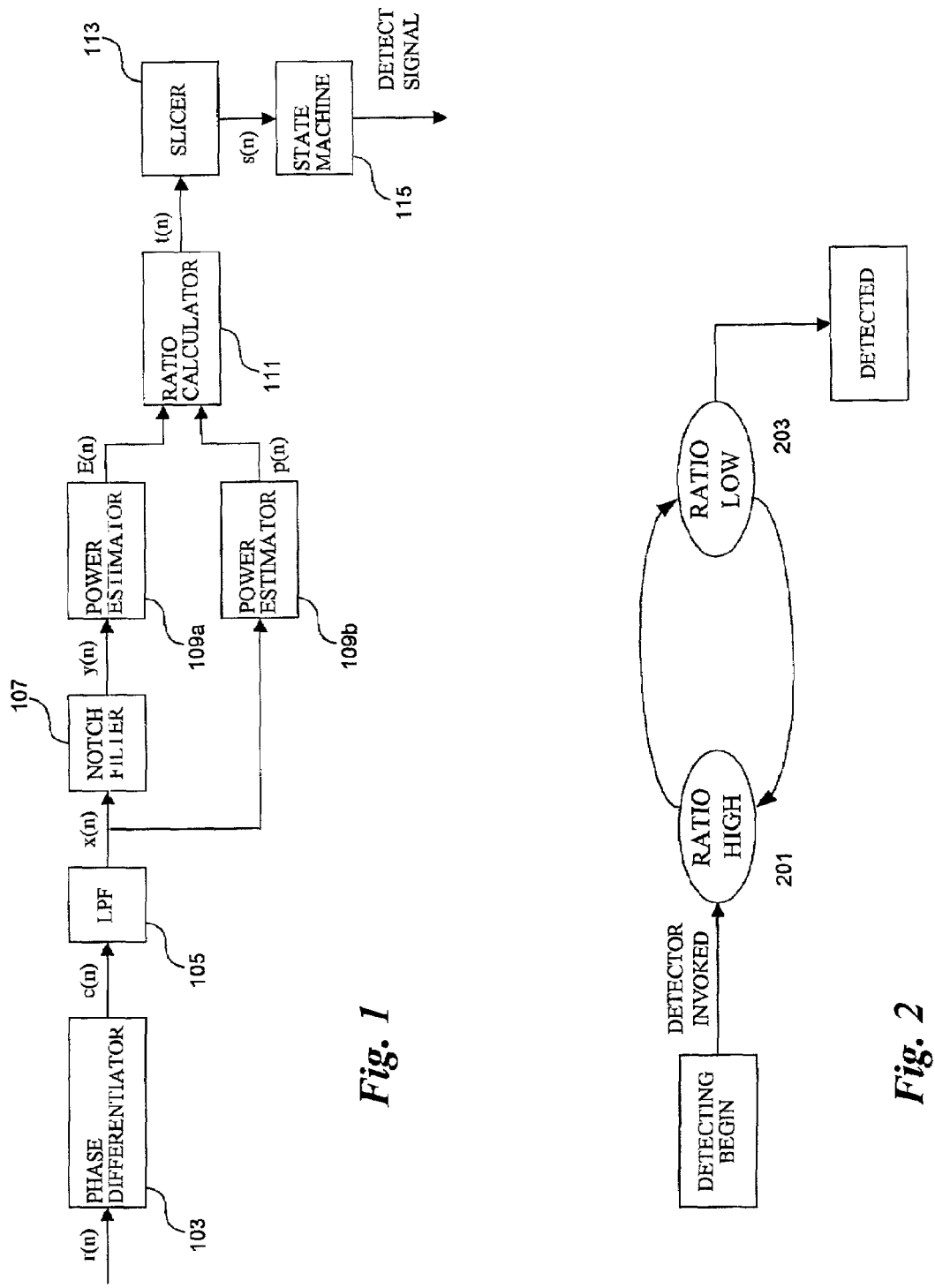

FIG. 1 is a block diagram illustrating the system of the present invention.

FIG. 2 is a state machine diagram illustrating the detection method of the present invention.

Figure 3:
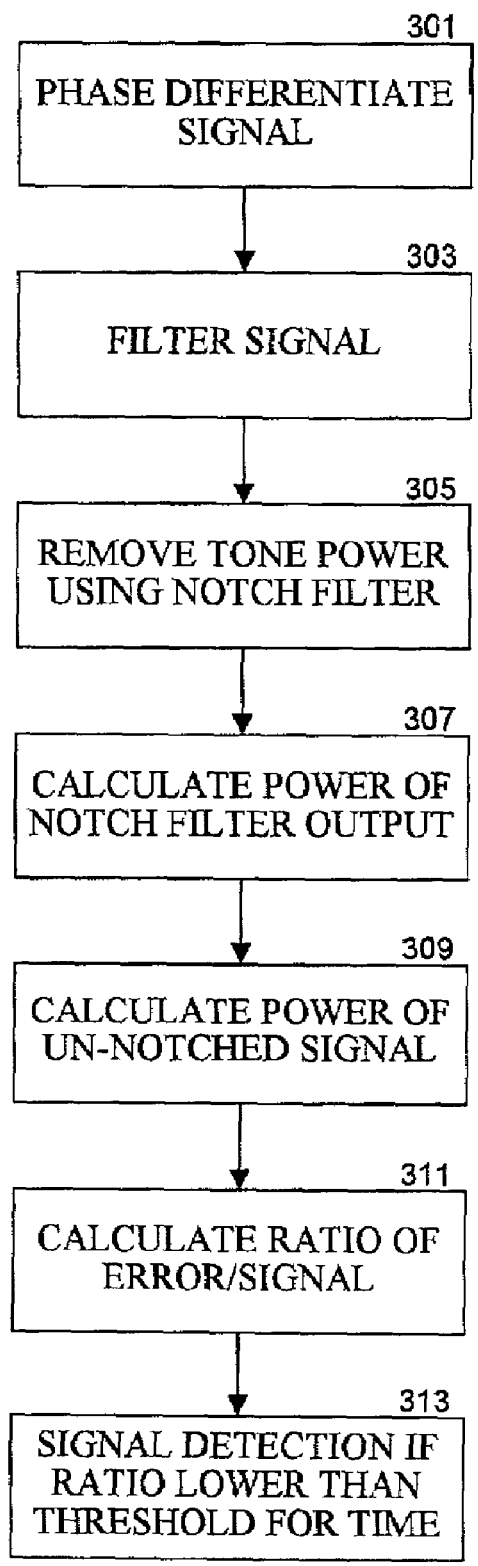

FIG. 3 is a flow diagram illustrating the method of the present invention.

DETAILED DESCRIPTION

The present invention describes a method and apparatus for detecting the frequency correction channel in a mobile telecommunications system. In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Further, although the present invention is described in terms of the GSM protocol, the system and method of the present invention can equally be applicable to any telecommunications system that utilizes a frequency correction channel, or any telecommunications system that requires the detection of a frequency. Thus, the description below is but one embodiment of the present invention is directed to the detection of a single tone in a FCCH of the GSM protocol.

1. Structure

FIG. 1 shows in block diagram form a detector 101 of one embodiment of the present invention. The detector 101 includes a phase differentiator 103, a low pass filter (LPF) 105, a notch filter 107, two power estimators 109a and 109b, a ratio calculator 111, a slicer 113, and a state machine 115. The internal details of these particular circuits are not part of, nor critical to, the invention and the detailed description of the internal circuit operation is not provided for reasons of brevity and so as not to obscure the present invention.

The input signal r(n) is comprised of complex samples at a sampling rate of 270 KHz (symbol rate) or 540 KHz (twice the symbol rate), in accordance with the GSM protocol. It can be appreciated that other protocols may dictate differing sampling rates. The input signal r(n) is typically a demodulated complex signal, i.e., with both real and imaginary parts. The input signal r(n) is provided by conventional receiving circuitry present in the subscriber unit.

The input signal is provided to the phase differentiator 103, which is operative to translate the tone into DC components. Details of this process are provided below. Next, the output of the phase differentiator (denoted as c(n)) is provided to the LPF 105, which is operative to limit noise. The resulting signal output by the LPF 105 is referred to as x(n).

Next, the signal x(n) is provided to second power estimator 109b. The signal x(n) is also provided as the input to a notch filter 107. The notch filter 107 is operative to remove the DC component of the signal x(n). Alternatively stated, the notch filter 107 removes the "signal tone portion" of the signal x(n) and passes the error (or noise) portion y(n) through to the first power estimator 109a. The output of the notch filter is designated as y(n). The notch filter 107 may be of the infinite impulse response (IIR) type.

The function of the first and second power estimators 109a and 109b is to estimate the power of both the notched (y(n)) and the un-notched signals (x(n)). As seen below, in one embodiment, the power is related to the square of the magnitude of the input signals. The estimated power from first power estimator 109a is denoted as E(n) and from the second power estimator 109b as P(n).

The ratio of the estimated powers E(n) and P(n) is taken by ratio calculator 111. The output of the power ratio is denoted as t(n). Next, a slicer 113 determines the presence of the tone. Specifically, a tone is determined to be present if the power ratio t(n) is below a predetermined threshold. The slicer 113 may be implemented in one embodiment as a comparator. Finally, for improving the stability of the detection, a state machine 115 is employed to refine the results. It should be noted that the analysis of the power ratio done by the slicer 113 and the state machine 115 is generally referred to a determining whether the power ratio fits a constraint. In certain situations, the specific analysis may vary from the embodiment described herein. Thus, the slicer 113 and state machine 115 may be replaced with a processor or the like.

2. Process

The foregoing can also be explained in mathematical terms. Specifically, the input signal r(n) is input into the phase differentiator 103. The phase differentiator 103 is operative to multiply the received signal r(n) with its delayed and conjugated version to generate a phase difference:

$$c(n)=r(n)r^*(n-k)$$

In particular, r(n) can be expressed as $Ae^{jw_0 n}$. Further, $r^*(n-k)$ can be expressed as $Ae^{-jw_0[n-k]}$. The parameter "A" is simply a constant. Given these formulations, c(n) is simply expressed as $A^2 e^{jw_0 k}$. This is the phase difference of the signal r(n).

Then, in one embodiment, the LPF 105 is a one-pole exponential window low pass filter that is applied to limit noise. The LPF can be expressed as:

$$x(n)=b \cdot x(n-1)+(1-b) \cdot c(n)$$

where b is the forgetting factor that is used to control the bandwidth of the filter.

Then, the DC component of x(n) is removed by passing the signal x(n) through the notch filter 107.

$$y(n)=x(n)-x(n-1)+\lambda y(n-1)$$

where λ is the parameter to determine the bandwidth of the stop band.

The power estimation performed by power estimators 109a and 109b can be expressed mathematically by $$P(n+1)=\beta \cdot P(n)+(1-\beta) \cdot \|x(n)\|^2$$

and $$E(n+1)=\beta \cdot E(n)+(1-\beta) \cdot \|y(n)\|^2$$

where β is the forgetting factor for power estimation.

The ratio calculated by the ratio calculator 111 is:

$$r(n) = \frac{E(n)}{P(n)}$$

The slicer 113 then derives the signal s(n) as $$s(n) = \begin{cases} 0 & r(n) < h \\ 1 & r(n) \geq h \end{cases}$$

where h is a predetermined threshold.

3. The State Machine

Ideally, the signal r(n) will follow a curve with a fixed pattern. It should be high initially, and change to low when the tone begins. It will return to high when the tone finishes. Thus, the presence of the FCCH can be simply determined by s(n). However more likely, there will be ripples in either the high part or the low part along the curve. If the ripple triggers the threshold (h), the detector becomes unstable. To resolve the issue, a state machine 115 is used. As seen in FIG. 2, the state machine 115 is initially at "ratio high" 201. When s(n) is lower than the threshold h continuously for p times, the state is changed to "ratio low" 203, and at the same time, a counter t is initiated from 0 (a count down may also be used). Before the counter counts to a preset value of t1, the state machine will stay in the "ratio low" 203 state. After t1 is reached and before t2 (another preset value) is reached, if r(n) shows continuous low p times, the FCCH is deemed to be detected. Otherwise, when t2 is reached the state machine will return to the "ratio high" 201 state.

4. Methodology

One embodiment of the present invention can be characterized in terms of a method, as shown in FIG. 3. Specifically, at step 301, the input signal r(n) is provided to the phase differentiator 103, which is operative to translate the tone into DC components and calculate the phase difference. Next, at step 303, the output of the phase differentiator (denoted as c(n)) is provided to the LPF 105, which is operative to limit noise. The resulting signal output by the LPF 105 is referred to as x(n).

Next, at step 305, the signal x(n) is provided as the input to a notch filter 107, which is operative to remove the DC component of the signal x(n). Alternatively stated, the notch filter 107 removes the "signal portion" of the signal x(n) and passes the error (or noise) portion y(n) through to the first power estimator 109a.

Next, at step 307, the power of the signal y(n) from the notch filter 107 is calculated. Similarly, at step 309, the power of the signal x(n) output by the LPF 105 is calculated.

At step 311, the ratio of the estimated powers E(n) and P(n) is taken by ratio calculator 111. The output of the power ratio is denoted as t(n). Next, at step 313, the slicer 113 and state machine 115 work in conjunction to determine if the ratio is below a predetermined threshold for a predetermined length of time. If so, then the frequency correction channel is deemed to have been detected.

In one embodiment, a state machine 115 is used to improve the stability and/or robustness of the detection method and system. However, the state machine 115 may be replaced in simpler implementations by a simple counter. For example, if the slicer 113 detects that the ratio is less than the predetermined threshold for a predetermined consecutive number of times (e.g. a predetermined time duration), then the tone is deemed to be detected.

In another embodiment, the ratio may be inverted such that the ratio is P(n)/E(n). In such a situation, the state machine 115 should be adapted to register tone detection if the ratio is higher than a predetermined threshold for a predetermined duration. This embodiment is functionally equivalent to the previous embodiment described above.

5. Parameters

Through empirical means, the following table summarizes the parameters related to the present invention that have been shown to be suitable for one embodiment. It can be appreciated that the optimal values can be somewhat different for different scenarios. However, simulations have shown that the following set of values works well for several common situations, including fading or static, flat or multipath, high SNR or low SNR.

The following parameters are for double sampling only.

| Symbolic Name | Meaning | Value |
|---|---|---|
| K | The delay of phase differentiator | 4 or beyond |
| B | Forgetting factor of the LPF | 0.88 |
| λ | Forgetting factor of the notch filter | 0.95 |
| β | Forgetting factor of the power estimators | 0.96 |
| H | Slicer threshold | 0.25 |
| P | Holding period of the state machine | 70 |
| t1 | Counter timer one of the state machine | 100 |
| t2 | Counter timer two of the state machine | 400 |

Although parameter values for one embodiment has been supplied, it has been found that the parameter values set forth in the table above may be varied and fall within a range. For example, the forgetting factor of the LPF 105 may be between 0.82 and 0.94. The forgetting factor of the notch filter may be between 0.92 and 0.99, the forgetting factor of the power estimators may be between 0.92 and 0.99, and the slicer threshold (h) may be between 0.1 to 0.5.

6. Conclusion

The foregoing discloses a phase-differentiation based FCCH detector 101. The method and apparatus of the present invention is simple, reliable and can fit for many different scenarios, from different sampling rates, to different channel environments. Simulation shows that reliable detections can be achieved for nearly all of the cases.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

Thus, the above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the GSM system described herein. These and other changes can be made to the invention in light of the detailed description.

We claim:

1. A method of detecting a tone signal from complex input samples r(n), said method comprising:
    (a) calculating the phase difference of the samples r(n) as a signal x(n);
    (b) filtering said signal x(n) with a notch filter to generate a notched output y(n);
    (c) estimating a power E(n) of said notched output y(n);
    (d) estimating a power P(n) of said signal x(n);
    (e) forming a ratio of said powers from said notched output y(n) and said signal x(n);
    (f) declaring said tone signal detected if said ratio satisfies a constraint,
wherein said phase difference is calculated in accordance with:

$$x(n)=r(n)r^*(n-k)$$

where x(n) is the phase difference result.

2. The method of claim 1 wherein said constraint is determining if said ratio is continuously lower than a predetermined threshold for a predetermined duration in the case of said ratio being formed as E(n)/P(n) and if said ratio is continuously higher than said predetermined threshold for a predetermined duration in the case of said ratio being formed as P(n)/E(n).

3. The method of claim 1 wherein said signal x(n) is first filtered with a low pass filter prior to its power estimation and prior to input into said notch filter.

4. The method of claim 3 wherein said low pass filter has a forgetting factor between 0.82 and 0.94.

5. The method of claim 1 wherein said notch filter has a forgetting factor between 0.92 and 0.99.

6. The method of claim 1 wherein said power estimation steps have a forgetting factor between 0.92 and 0.99.

7. The method of claim 1 wherein said predetermined threshold has a value of between 0.1 and 0.5.

8. The method of claim 1 wherein the process of comparing the ratio to the predetermined threshold is performed by a state machine.

9. The method of claim 1 wherein said power estimating steps are performed in accordance with:

$$P(n+1)=\beta \cdot P(n)+(1-\beta) \cdot \|x(n)\|^2$$

and $$E(n+1)=\beta \cdot E(n)+(1-\beta) \cdot \|y(n)\|^2$$

where β is the forgetting factor for power estimation.

10. A method of detecting a frequency correction tone signal from an input signal r(n) comprising:
    (a) determining a phase difference signal c(n) of the input signal r(n);
    (b) filtering said phase difference signal c(n) using a low pass filter to provide a filtered signal x(n);
    (c) notch filtering said filtered signal x(n) with a notch filter to generate a notched filtered signal y(n);
    (d) calculating a power estimate E(n) of said notched filtered signal y(n);
    (e) calculating a power estimate P(n) of said filtered signal x(n);
    (f) forming a ratio of said power estimates as E(n)/P(n);
    (g) comparing said ratio with a predetermined threshold, and if said ratio is continuously lower than a predetermined threshold for a predetermined duration in the case of said ratio being formed as E(n)/P(n), and if said ratio is continuously higher than said predetermined threshold for a predetermined duration in the case of said ratio being formed as P(n)/E(n), declaring that said frequency correction tone signal is detected, wherein said power estimation is performed in accordance with:

$$P(n+1)=\beta \cdot P(n)+(1-\beta)\cdot \|x(n)\|^2$$

and $$E(n+1)=\beta \cdot E(n)+(1-\beta)\cdot \|y(n)\|^2$$

where $\beta$ is the forgetting factor for power estimation.

11. The method of claim 10 wherein said phase difference is calculated in accordance with:

$$c(n)=r(n)r^*(n-k)$$

where c(n) is the phase difference result.

12. A detector for detecting a tone signal from complex input samples r(n), said detector comprising:
(a) a phase differentiator for calculating the phase difference of the samples r(n) as a signal x(n);
(b) a notch filter that filters said signal x(n) to generate a notched output y(n);
(c) a first power estimator for estimating a power E(n) of said notched output y(n);
(d) a second power estimator for estimating a power P(n) of said signal x(n);
(e) a ratio calculator for determining a ratio of said powers from said notched output y(n) and said signal x(n);
(f) a processor for determining if said ratio satisfies a constraint and declaring said tone signal is detected if said constraint is satisfied,
wherein said phase differentiator calculates the phase difference in accordance with:

$$x(n)=r(n)r^*(n-k)$$

where x(n) is the phase difference result.

13. The detector of claim 12 wherein said processor is adapted determine if said ratio is continuously lower than a predetermined threshold for a predetermined duration in the case of said ratio being formed as E(n)/P(n) and if said ratio is continuously higher than said predetermined threshold for a predetermined duration in the case of said ratio being formed as P(n)/E(n).

14. The detector of claim 12 further including a low pass filter for filtering said signal x(n) prior to input to said second power estimator and prior to input into said notch filter.

15. The detector method of claim 14 wherein said low pass filter has a forgetting factor between 0.82 and 0.94.

16. The detector of claim 12 wherein said notch filter has a forgetting factor between 0.92 and 0.99.

17. The detector of claim 12 wherein said power estimators have a forgetting factor between 0.92 and 0.99.

18. The detector of claim 12 wherein said predetermined threshold has a value of between 0.1 and 0.5.

19. The detector of claim 12 wherein the processor implements a state machine that compares the ratio to the predetermined threshold.

20. The detector of claim 12 wherein said power estimators perform in accordance with:

$$P(n+1)=\beta \cdot P(n)+(1-\beta)\cdot \|x(n)\|^2$$

and $$E(n+1)=\beta \cdot E(n)+(1-\beta)\cdot \|y(n)\|^2$$

where $\beta$ is the forgetting factor for power estimation.

* * * * *